(12) United States Patent
Wall

(10) Patent No.: US 9,525,683 B2
(45) Date of Patent: Dec. 20, 2016

(54) SECRET SUPPLEMENTAL USERNAME

(71) Applicant: Interactive Intelligence, Inc., Indianapolis, IN (US)

(72) Inventor: Charles Wall, Durham, NC (US)

(73) Assignee: INTERACTIVE INTELLIGENCE GROUP, INC., Indianapolis, IN (US)

( * ) Notice: Subject to any disclaimer, the term of this patent is extended or adjusted under 35 U.S.C. 154(b) by 33 days.

(21) Appl. No.: 14/611,581

(22) Filed: Feb. 2, 2015

(65) Prior Publication Data
US 2016/0226853 A1  Aug. 4, 2016

(51) Int. Cl.
*H04L 9/32* (2006.01)
*H04L 29/06* (2006.01)

(52) U.S. Cl.
CPC ......... *H04L 63/083* (2013.01); *H04L 63/1425* (2013.01)

(58) Field of Classification Search
CPC ........ H04L 63/08; H04L 63/083; H04L 63/10; H04L 63/12; H04L 63/14; H04L 63/20; H04L 63/1425; H04L 63/1458; H04L 63/1466; H04L 63/1416; G06F 21/30; G06F 21/31; G06F 21/55; G06F 21/60
USPC .................. 726/2–6, 22–23, 26–29; 713/168
See application file for complete search history.

(56) References Cited

U.S. PATENT DOCUMENTS

| | | | | |
|---|---|---|---|---|
| 6,144,959 A * | 11/2000 | Anderson | ............... | G06F 21/31 |
| 7,552,467 B2 * | 6/2009 | Lindsay | .................. | G06F 21/31 |
| | | | | 713/165 |
| 8,161,527 B2 * | 4/2012 | Curren | ................ | G06F 21/6227 |
| | | | | 713/164 |
| 8,336,091 B2 * | 12/2012 | Wong | ...................... | H04L 63/08 |
| | | | | 726/5 |
| 8,738,923 B2 * | 5/2014 | Kottahachchi | ................ | 713/183 |

* cited by examiner

*Primary Examiner* — Hosuk Song

(57) ABSTRACT

Methods for a secret supplemental username are provided. In one example, a method includes the steps of detecting a threat to an account with a primary username and password and disabling the primary username associated with the account in response to the threat. The method includes the additional steps of generating a supplemental username associated with the account and securely communicating the supplemental username.

14 Claims, 6 Drawing Sheets

200

Generate a Supplemental Username Associated with an Account based at least in part on user input
202

Confirm an Attack on the Account
204

Disable a Primary Username Associated with the Account
206

Generate a Notification that the Primary Username has been Restricted
208

Activate the Supplemental Username
210

```
┌─────────────────────────────────────┐
│   Determine a Threat on an Account  │
│              has Ended              │
│                                 302 │
└─────────────────────────────────────┘
                   │
                   ▼
┌─────────────────────────────────────┐
│    Disable a Supplemental Username  │
│       Associated with the Account   │
│                                 304 │
└─────────────────────────────────────┘
                   │
                   ▼
┌─────────────────────────────────────┐
│      Enable the Primary Username    │
│       Associated with the Account   │
│                                 306 │
└─────────────────────────────────────┘
```

SECRET SUPPLEMENTAL USERNAME

FIELD

This invention relates generally to electronic accounts, and more specifically to secret supplemental usernames.

BACKGROUND

Conventional electronic accounts may be accessed using a computer by submitting a username and password combination. A typical username may comprise some or all of a person's email address, or a combination of letters based on the person's first and last name. As a result, an individual's user name for a particular service may be widely known or easily guessed.

One method for attacking an electronic account is through a brute force attack, where an attacker tries username and password combinations over and over until gaining access to the account. When an individual's username is openly known or easily guessed, their associated electronic accounts are particularly susceptible to brute force attacks. A conventional response to a brute force attack is to disable an account. While disabling the account may thwart the attacker, it can also impede the account owner from properly accessing their own account.

Thus there is a need for new methods to protect electronic accounts.

SUMMARY

Embodiments of the invention facilitate access to a threatened user account through a supplemental username. An exemplary method may comprise the steps of detecting a threat to a user account, the threat comprising at least five failed attempts to access the user account within five minutes, a failed attempt comprising receiving an incorrect username and password combination and restricting access to the user account by disabling access to the user account via a primary username associated with the user account. The method comprises the additional steps of generating a notification that the user account has been disabled, generating a supplemental username associated with the account, and securely delivering the supplemental username.

In another aspect, a method comprises the steps of detecting a threat to an account associated with a primary username and a password, disabling the primary username associated with the user account in response to the threat, generating a supplemental username associated with the user account, and securely communicating the supplemental username.

In another aspect, a method comprises generating an account comprising a primary username and a password and creating a supplemental username based on user input. The method further comprises detecting a threat to the account, disabling the primary username, generating a secure notification associated with the disabled username, and enabling the supplemental username for accessing the account.

Further embodiments, features, and advantages of the invention, as well as the structure and operation of the various embodiments of the invention are described in detail below with reference to the accompanying drawings.

BRIEF DESCRIPTION OF THE DRAWINGS

The accompanying drawings, which are incorporated herein and form a part of the specification, illustrate the present invention and, together with the description, serve to explain the principles of the invention and to enable a person skilled in the pertinent art to make and use the invention.

FIG. 2 is a flow chart illustrating a method according to another embodiment.

FIG. 3 is a flow chart illustrating a method according to another embodiment.

DETAILED DESCRIPTION

Figure 1:
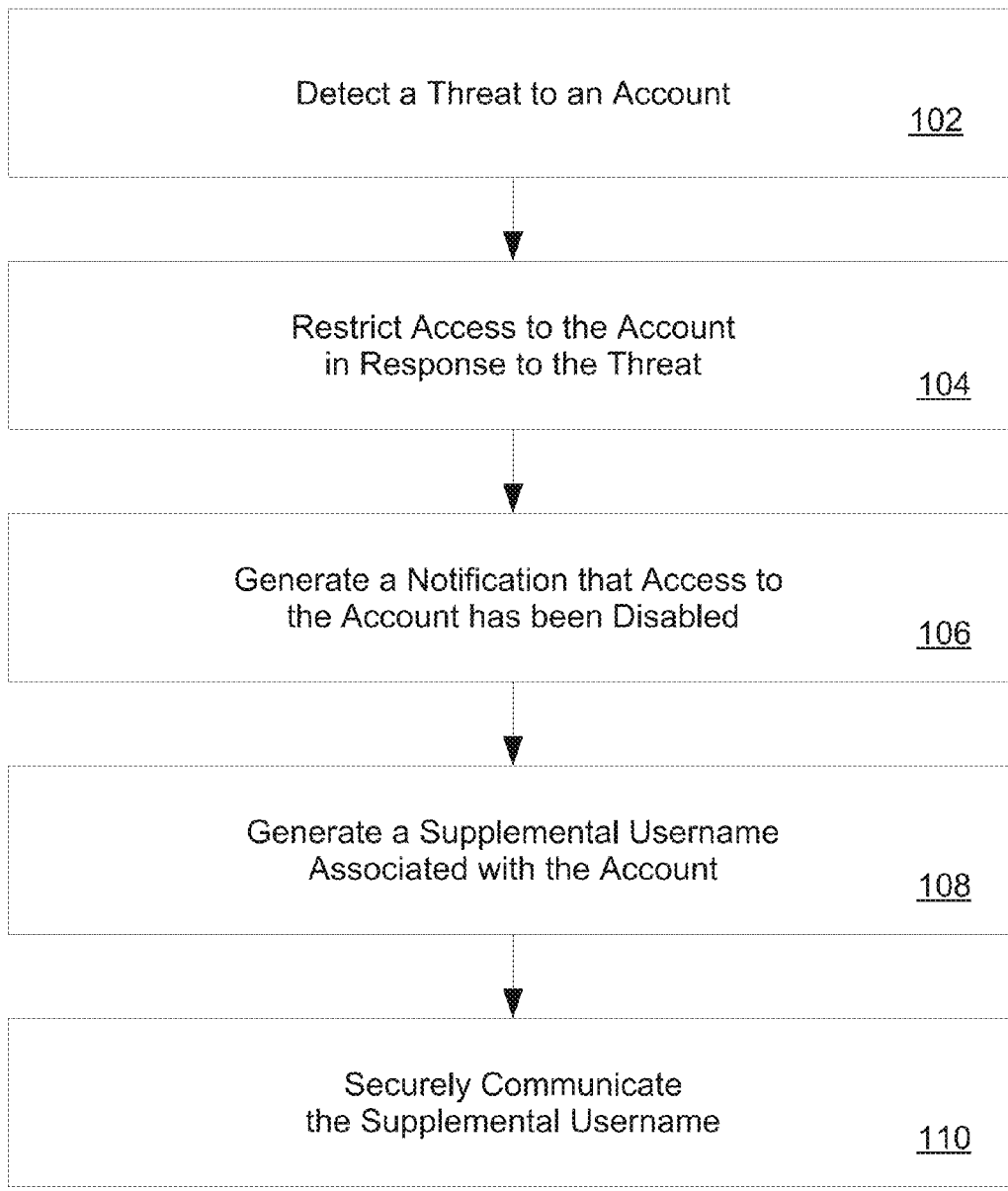
FIG. 1 is a flow chart illustrating a method according to an embodiment.

Embodiments are described for secret supplemental usernames. According to embodiments, access to an account that is being threatened or attacked may be maintained through the use of a secret supplemental username. In one exemplary embodiment a system may provide access to an account through validated account credentials in the form of a username and password.

In the example, a user may access an account by loading a login page in a web browser and submitting a username and password combination. While the password may be secret, usernames may be public or easily guessed. Because of the conspicuous nature of usernames, an attacker may target the account and attempt a brute force attack on the system by submitting the known username with a succession of guessed passwords.

A threat, or a potential attack on the account, may be detected based on receiving multiple username and incorrect password submissions. The threat may be confirmed as an attack if a specific number of incorrect username/password submissions are received within a short period of time. In the example, a threat may be confirmed after five incorrect username/password submissions are received within one minute. After the threat is confirmed as an attack, access to the account may be restricted by disabling access to the account via the primary username. Additionally, a notification may be generated and displayed on the account login page, stating that the primary username has been disabled. Such notification may satisfy the attacker that their efforts were successful, and lead them to stop their attack on the account and potentially the system.

When the primary username is disabled, a supplemental username associated with the account may be randomly generated and associated with the account. Because the supplemental username may be randomly generated, it may be much more difficult for an attacker to continue targeting the same account for attack through a secret username. The supplemental username may also be paired with the same password as the original account username. The supplemental username may be securely communicated to the user associated with the account, such as through text message or physical delivery. Because the same password is associated with the supplemental username, security of the account may not be further compromised. The user may then continue to access their account through use of the supplemental username and the original password.

Illustrated Methods

Selected methods are illustrated and described for secret supplemental usernames. A secret supplemental username may facilitate access to a user's account, even while that user's account is under a targeted attack and their primary username is disabled. During a brute force attack, or exhaustive key search, an attacker may target a user's account by submitting their username and a succession of guessed passwords, such as every possible key or password. Account systems may automatically disable an account for a period of time in response to an attack, stopping the targeted attack, but also locking the authentic user out of their account during the lock-out period. By generating a supplemental username associated with the account, users may continue to access their account even while their primary username is disabled.

FIG. 1 is a flow chart illustrating a method according to an embodiment. As shown in FIG. 1, in step 102 of method 100, a threat to an account may be detected. An account (sometimes referred to as a user account or an electronic account) may be associated with a user, and may allow a user to be authenticated by a system to gain access to resources provided by or connected with the system. In one scenario, an account may comprise a collection of information that informs a system which files and folders a user can access, what changes the user can make to the system, and personal preferences for that user, such as system sounds and visual color schemes. Examples of accounts include, without limitation, system account, email accounts, gaming accounts, and social media accounts.

A system may require at least a username and a password to access an account. A username may comprise a string of letters, numbers, and characters. Examples of usernames include, without limitation, a user's email address, a users first name+last name, or some combination of a user's last or first name and initials. Other systems may only require a username for each account, such as a guest account with limited account privileges.

An account may be accessed on a server over a network, such as the Internet. Users may access an account by submitting proper, or correct account credentials such as a username and password combination. A user may submit the username and password through a form presented on a webpage and viewed in a web browser. As one alternative, a user may submit a username and password combination through an application, or app, on a mobile device such as a phone or tablet. A server may receive the username and password, and check a database to confirm that the received username corresponds with an existing account, and that the received password is correct, i.e. exactly corresponds with the account.

A password may be used to authenticate the identity of the user submitting the username and attempting to access the associated account. A password may comprise one or more letters, numbers, symbols, or some combination. As one alternative, a password may comprise a biometric identifier, such as a fingerprint, retina scan, or voice. Some passwords may be static, and change only on user input. Other passwords may be dynamic, and may change based on different factors such as the time of day or date.

A threat may comprise a predetermined threshold of attempts to access an account via submission or receipt of an incorrect username and password combination. A threat may be confirmed when the number of attempts exceeds the predetermined threshold of attempts to access the account. A system may comprise a threat counter for incrementing each time an incorrect username and password combination is received. In one embodiment, the threat counter may be reset to zero when a correct username and password combination is received. In another embodiment, the threat counter may be decremented as time elapses without an incorrect attempt to access the account. For example, the threat counter may reach four after four incorrect username and password combinations are received. The threat counter may be decremented to three after one day if no additional incorrect username and password combination is received. A threat counter may be decremented on a linear scale, such as decrementing one for each set period of time (e.g. one decrement every ten minutes, every hour, or every day). As one alternative a threat counter may be decremented on a different scale, or no scale at all. For example, a threat counter may be decremented by one after 30 minutes, by three after 60 minutes, and completely reset after 90 minutes.

The predetermined threshold of attempts may set, or changed, based on one or more factors. In one embodiment the predetermined threshold of attempts may be set according to how often a system has been threatened or attacked. For example, if a system has not detected a threat or experienced an actual attack over a period of time, such as one week, one month, or one year, than the predetermined threshold of attempts may be increased.

In another embodiment, the predetermined threshold of attempts may be set, or based on, a number of attempts indicative of an intruder attempting to attack an account. As one example, ten submissions of an incorrect username and password combination may be indicative of an actual attack rather than the legitimate attempts of an authorized user to access their account. In another example, only three submissions of an incorrect username and password combination may be indicative of an actual attack rather than legitimate attempts by a user.

The predetermined threshold may be based at least in part on a user characteristic or user behavior. In one embodiment, the predetermined threshold may be different for different users according to each user's individual behavior. Over time, data regarding a user's legitimate attempts to access their account may be gathered. This data may be used to adjust the predetermined threshold for that user.

When a user account is initially created, the predetermined threshold may be set to a number that may be indicative of an attack across all accounts according to historical data. As a system learns about the behavior of a user and their likelihood of legitimate but incorrect attempts to access their account, the predetermined threshold may be increased or decreased. A user more likely to mistype or misremember their password may have a higher predetermined threshold of attempts before a threat is detected. A user less likely to mistype or misremember their password may have a lower predetermined threshold of attempts. Legitimate but incorrect attempts to access an account may be correlated with a number of incorrect attempts to access an account followed by a request for the password hint or to reset the account password.

The threat may comprise a predetermined number of attempts to access an account within a predetermined period of time. A threshold timer may begin after the first incorrect username and password combination is submitted, while a threshold number of attempts may be incremented for each received incorrect username and password combination. A threat may be confirmed as an attack on an account if the threshold number of attempts is reached within a predetermined period of time.

In one embodiment, a threat comprises five attempts to access the account via submission of an incorrect username and password combination within five minutes. In another embodiment, the predetermined number of attempts to access an account may be ten, and the predetermined period of time may be one minute.

In step 104, access to an account may be restricted in response to the threat. Access to the account may be restricted by disabling a primary username associated with the account. Disabling the primary username may effectively disable an account until a supplemental username associated with the account is generated.

In step 106, a notification may be generated that access to the account has been disabled. A server, such as server 308, as illustrated in FIG. 3, may generate the notification. The notification may be a graphical notification, such as a picture or text. The notification may be an audio notification, such as a system error sound, or a .wav file. The notification may state that the account has been disabled, restricted, or otherwise inaccessible. The notification may be displayed on a client device, such as client device 302, 304 illustrated in FIG. 3 and discussed below. In one scenario, after a disabled username is submitted, the client device may refresh the screen and display the notification.

In one embodiment an attacker may use a client device to attack an account on a server. The server may detect the threat to the account, restrict access to the account, and generate a notification that access to the account has been restricted. The notification may be communicated to the client device, and may alert the attacker that their attack has been successful in the form of automatically restricting access to the account by any user. The notification may thus serve to satisfy the attacker that no further action can be taken to access the account, causing the attacker to stop submitting account credentials.

In another embodiment, no notification may be generated that access to the account has been restricted. When no notification is generated, an attacker may remain unaware that their attacks have been detected. The primary username may be privately or secretly disabled, without providing any external notification that the primary username has been disabled. This may be advantageous in thwarting attacks on an account, since an attacker may continue attacking an account in futility without knowledge that a primary username has been disabled. An attacker may become satisfied in her attempts to threaten or disable the account.

In step 108, a supplemental username may be generated. The supplemental username may be generated in response to the threat, or in response to a confirmed attack. A server may generate the supplemental username at the same time or immediately after a primary username has been disabled. The supplemental username may contain a combination of letters, numbers, or symbols. The supplemental username may be associated with the account, and access to the account may be granted through submission of the combination of the supplemental username and the password. In some embodiments, an account has only one password, and the password may be used with the primary username or the supplemental username.

In a first embodiment, the supplemental username may be randomly generated. A randomly generated supplemental username may be extremely difficult, if not impossible, for an attacker to guess. By randomly generating the supplemental username, the supplemental username may remain a secret until it is securely communicated to a user.

In a second embodiment, the supplemental username may be generated based at least in part on user input. During account creation a user may be requested to create both a primary username and a supplemental username. By letting a user create their own supplemental username, any communication of the supplemental username may be avoided. However, a user may forget their supplemental username, necessitating.

In step 110, the supplemental username may be securely communicated. A supplemental username may be securely communicated, for example, via text message, phone call, or physical delivery. Secure communication of the supplemental username through text message or phone communication may be accomplished automatically or manually, with assistance from a system administrator. Physical delivery of the supplemental username may be the most secure form of communicating the supplemental username, as it may be very unlikely to be intercepted by a third party. However, physical delivery of the supplemental username may not always be feasible.

In the scenario that the supplemental username is paired with the same password as the primary username, the user may be presumed to remember their password, and no communication of the password is necessary. This may be advantageous during the delivery step, since only the new supplemental username would be delivered, as opposed to delivery of the new supplemental username and a new password. Furthermore, if the attacker has already guessed the password, it is unlikely that the threat would have been detected.

FIG. 2 is a flow chart illustrating a method according to another embodiment. As illustrated in FIG. 2, in step 202 of method 200, a supplemental username associated with an account may be generated. The supplemental username may be generated based at least in part on user input. In one scenario, a user may be requested to specify a supplemental username during creation or initialization of an account. In another scenario, a user may be requested to specify a supplemental username at a later time. In the scenario, after a threat has been detected on an account, a system administrator may contact a user to request a supplemental username.

As one advantage, generating a supplemental username based on user input may make the supplemental username easier for the user to remember, and may obviate the need to securely communicate the supplemental username after a threat has been detected. As one disadvantage, generating a supplemental username based on user input may lead the user to store their supplemental username in an insecure location or even share their supplemental username with other people, thus reducing its secrecy and effectiveness.

In step 204, an attack on the account may be confirmed. A threat may be confirmed as an attack when a predetermined number of incorrect username/password submissions are received within a predetermined period of time. In one example, a threat may be confirmed after five incorrect username/password submissions are received within five minutes. In another example, a threat may be confirmed after ten incorrect username/password submissions are received within twenty seconds.

A threat may be confirmed as an attack if external confirmation of the attack is received. For example, a user may be contacted through text message, telephone, or email, regarding suspicious activity. The user may then manually confirm that the threat is attack if they recognize the attempts to access their account as fraudulent or illegitimate. During user confirmation of an attack, the user may be requested to specify a supplemental username, or a randomly generated supplemental username may be communicated to the user.

In step 206, a primary username associated with the account may be disabled. A server may disable the primary username, such that it cannot be used to access the account, even when it is submitted in combination with the account password. The primary username may be disabled in response to a detected threat or in response to a confirmed attack.

Figure 6:
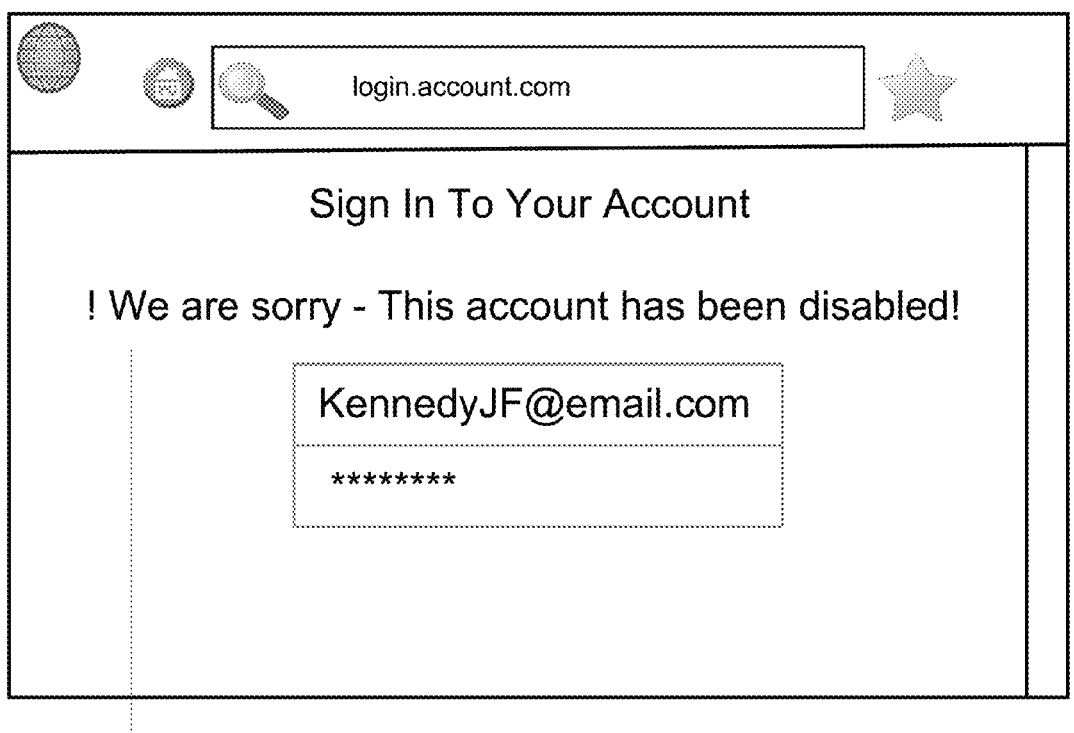
FIG. 6 is a screenshot illustrating an embodiment.

In step 208, a notification may be generated that the primary username associated with the account has been restricted. A server may generate the notification, which may be displayed on a client device. The notification may be specific to a username and account, and may be displayed on a login page after the username is entered. One example of a notification is illustrated in FIG. 6 and as described below.

In step 210, the supplemental username may be activated. A supplemental username may be activated after a threat has been detected, after a threat has been confirmed as an attack, after a primary username has been disabled, or after a notification has been generated.

After some period of time is passed, it may be determined that a threat has ended, or no longer exists. After a threat or an attack is over, the system may re-enable the primary username. FIG. 3 is a flow chart illustrating a method according to another embodiment. As illustrated in FIG. 3, in step 302 of method 300, it may be determined that a threat to an account has ended. The system may determine that the threat has ended, or no longer exists based on one or more factors. In one embodiment a system may determine that a threat has ended based on receiving less than a threshold number of incorrect username/password combinations associated with an account over a predetermined period of time. For example, the system may determine that a threat has ended after zero, or less than a threshold of one, incorrect username/password combinations associated with an account have been received over a period of one day. As another example, the system may determine that a threat has ended after one or fewer incorrect username/password combinations associated with an account have been received over a period of two hours.

In step 304, a supplemental username associated with the account may be disabled. In one embodiment, a system may enforce a rule that only one username be active and capable of accessing an account. By limiting the use of a supplemental username and disabling it after a threat has ended, the secrecy and security of the supplemental username may be enhanced.

In another embodiment, a system may allow access to an account through multiple usernames at the same time. In such an embodiment, step 304 may be omitted. In this manner a user may choose to access their account through a publicly-known username or a secret supplemental username. By maintaining access to the account through the supplemental username, secure re-delivery of the supplemental username may be avoided when a new threat is detected to the account, and the primary username is disabled.

In one embodiment, when a threat no longer exists, a supplemental username may be deactivated and deleted. When a new threat is detected, or an attack is confirmed, a new supplemental username may be generated. In another embodiment, when a threat no longer exists, or is detected, a supplemental username may be deactivated, but remain associated with the account. In this way, the same supplemental username may be reactivated in the future when a new threat is detected.

Illustrated System

Figure 4:
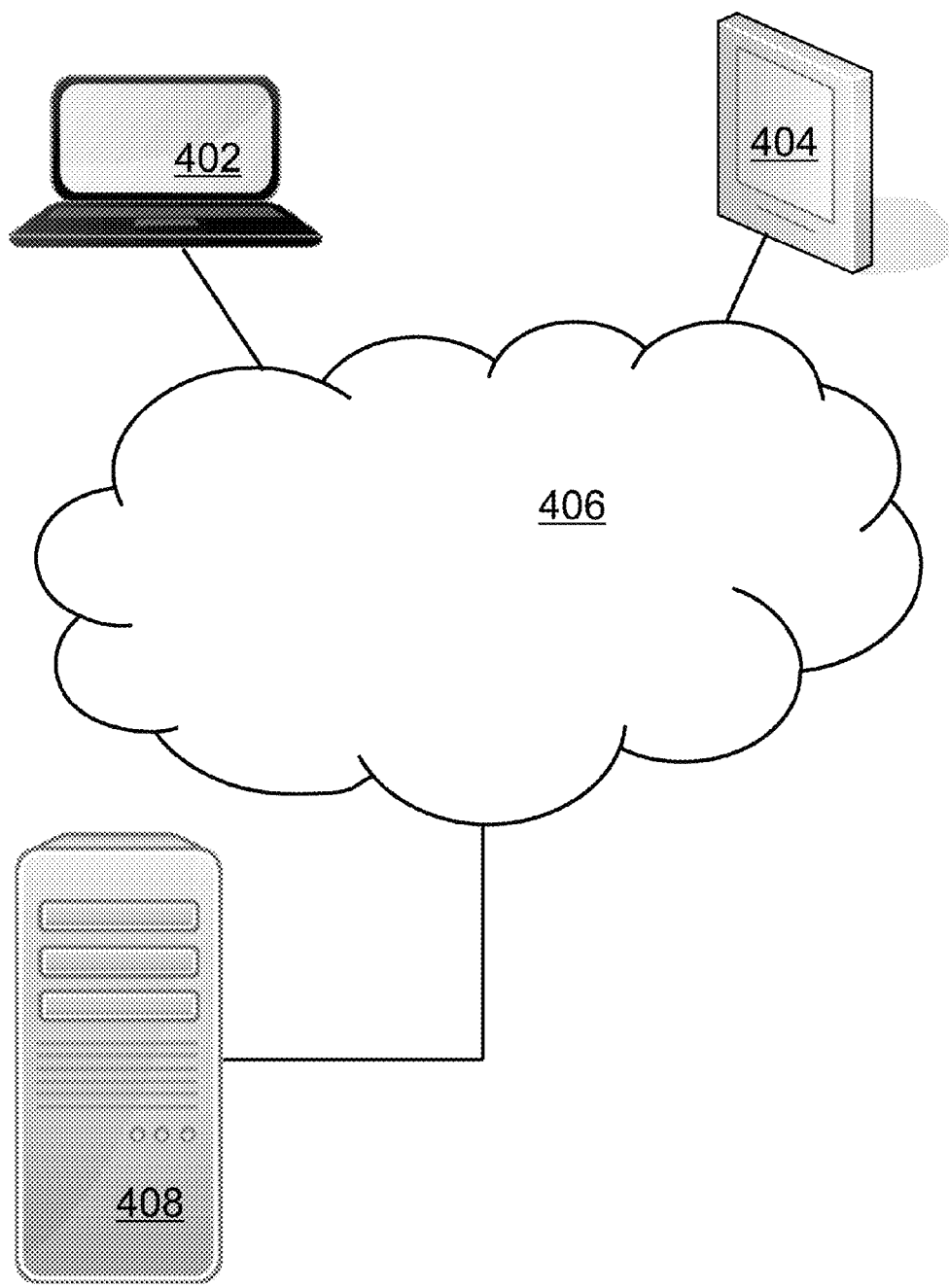
FIG. 4 is a diagram illustrating a system according to an embodiment.

FIG. 4 is a diagram illustrating a system according to an embodiment. System 400 comprises client devices 402, 404, network 406, and server 408. Client devices 402, 404 and server 408 may be in communication over network 406. Network 406 may comprise the Internet, an intranet, or extranet, or some other type of electronic network.

An electronic account may be accessed on server 408 through one or more client devices. A client device may comprise a personal computer, such as personal computer 302, or a mobile device, such as mobile device 404. Other examples of client devices comprise video game systems and other network-enabled devices. Server 408 may receive account credentials from a client device over network 406, and authenticate the account credentials to access an account. Account credentials may comprise a username and a password.

As illustrated in FIG. 4, client device 402 comprises a personal computer and client device 404 comprises a mobile device. A mobile device may comprise a smartphone, e-reader, phablet, or a tablet. In other embodiments, a client device may comprise other types of devices. A client device may be a network-enabled device, configured to communicate with server 408 over network 406. Client devices 402, 404 may be configured to generate a graphical user interface, and execute an application within the graphical user interface. Applications operating on client devices may comprise native mobile device applications such as an iOS iPad application, a Windows Phone application, or an Android application. As one alternative, an application operating on a client device may comprise a web application accessed through a web browser. Account credentials may be submitted over network 406 through an application executing on a client device and received by server 408 to access an account.

Illustrated Screenshots

Figure 5:
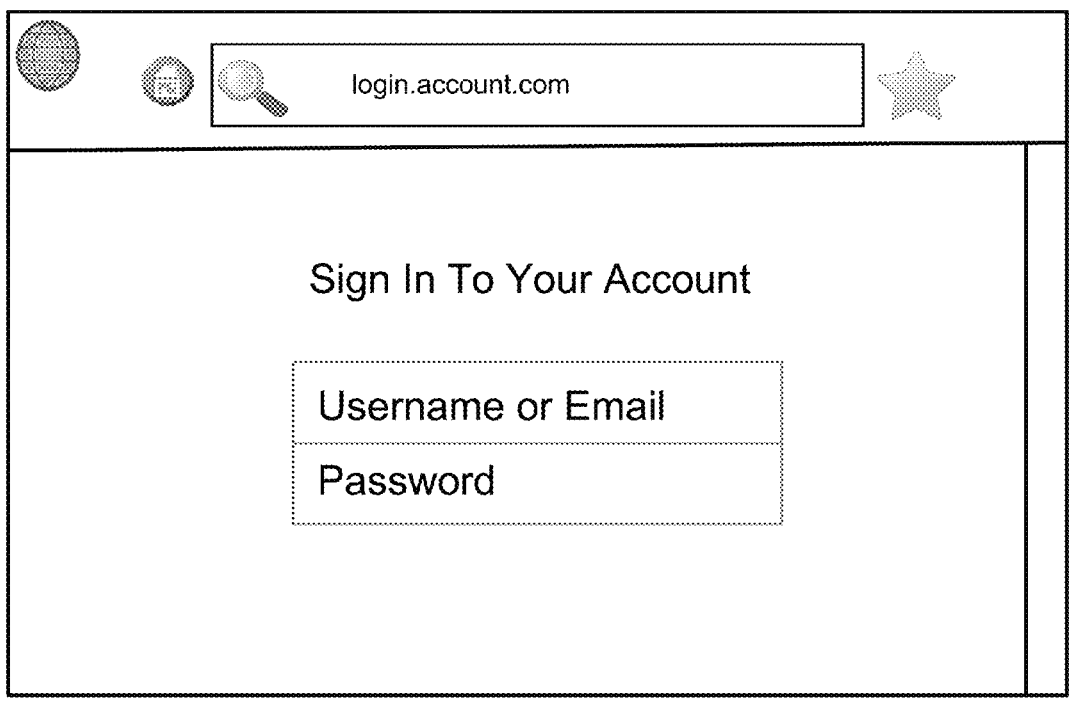
FIG. 5 is a screenshot illustrating an embodiment.

Selected methods are illustrated and described for secret supplemental usernames. FIG. 5 is a screenshot illustrating an embodiment. As shown in screenshot 500 of FIG. 5, a web browser displays a login page for an account. The web browser may be executing on a client device, such as a personal computer, smart phone, or tablet. In another embodiment, a login page may be displayed by an application such as an iOS application, a Windows application, or an Android application.

A user may submit account credentials through a login page, such as shown in screenshot 500, to gain access to an account. As illustrated in FIG. 5, a system may request account credentials in the form of a username and password. In another embodiment, a system may request other account credentials in addition to, or in place of, a username and password. For example, a system may request login credentials comprising a username, password, and Completely Automatic Public Turing test to tell Computer and Humans Apart (i.e. a CAPTCHA). In FIG. 5, all account credentials may be requested and displayed on a single screen. In another embodiment, account credentials may be requested in succession and displayed on separate screens. For example, a first screen may display a username and CAPTCHA field, while a second screen may display a password field.

A user may submit account credentials through a login page as illustrated in FIG. 5. Account credentials, such as a username and password, may be received over a network after they are submitted on a client device. The account credentials may be validated by a server, such as server 408 as illustrated in FIG. 4. If the received account credentials are properly validated, than the account may be accessed and an account page may subsequently be displayed in the web browser executing on the client device. If the received account credentials are not properly validated, for example, if an incorrect username and password combination is received, than the login page may be displayed again on the client device.

As one example, a user may load a native application on their smartphone to access an account. The native application may display a login page, requesting account credentials in the form of a username and password. A user may enter their alphanumeric username and password through the login page, and submit the completed account credentials. A server may receive the account credentials over the Internet, and validate the username and password. If the account credentials are properly validated, than the system may transmit account information to the smartphone. If the account credentials are not properly validated than the login page requesting account credentials may be redisplayed by the native application. Further, the native application may display an error message on the login page, such as "Incorrect username or password. Please try again."

FIG. 6 is a screenshot illustrating an embodiment. As shown in screenshot 600 of FIG. 6, a web browser displays a login page for an account. The web browser may be executing on a client device, such as a personal computer, smart phone, or tablet. In another embodiment, a login page may be displayed by an application such as an iOS application, a Windows application, or an Android application.

In screenshot 600, the login page comprises notification 610 that the account has been restricted. Notification 610 may be generated after a threat to a user account has been detected, after a threat has been confirmed as an attack, or after a primary username has been disabled. Notification 610 may or may not explicitly state that a threat or attack has been detected. Notification 610 may state that an account has been disabled or restricted. Because the purpose of an attack may simply be to restrict access to an account, an attacker may be satisfied with their efforts upon seeing the notification, and as a result stop their attack.

A notification may not have any information related to a supplemental username. It may be advantageous to keep the existence of the supplemental username, as well as the user's ability to access their restricted account through the supplemental username, secret from the public and any attackers. If an attacker realizes that an account has not been successfully disabled, the attacker may continue to attack an account, or otherwise try to disable the account.

In another embodiment, a notification is not generated, even if a threat to an account has been detected.

Scope

Embodiments of a subset or all and portions or all of the above may be implemented by program instructions stored in a memory medium or carrier medium and executed by a processor. A memory medium may be a transitory medium or non-transitory medium. A memory medium may include any of various types of memory devices or storage devices. The term "memory medium" is intended to include an installation medium such as a Compact Disc Read Only Memory (CD-ROM) floppy disks, tape device, a computer system memory or random access memory such as Dynamic Random Access Memory DRAM Double Data Rate Random Access Memory DDR RAM Static Random Access Memory SRAM Extended Data Out Random Access Memory EDO RAM Rambus Random Access Memory RAM etc. or a non-volatile memory such as a magnetic media e.g. a hard drive or optical storage. The memory medium may comprise other types of memory as well or combinations thereof. In addition the memory medium may be located in a first computer in which the programs are executed or may be located in a second different computer that connects to the first computer over a network such as the Internet. In some instances the second computer may provide program instructions to the first computer for execution. The term memory medium may include two or more memory mediums that may reside in different locations e.g. in different computers that are connected over a network.

In some embodiments a computer system at a respective participant location may include a memory medium on which one or more computer programs or software components according to one embodiment of the present invention may be stored For example the memory medium may store one or more programs that are executable to perform the methods described herein The memory medium may also store operating system software as well as other software for operation of the computer system.

Modifications and alternative embodiments of one or more aspects of the invention may be apparent to those skilled in the art in view of this description. Accordingly this description is to be construed as illustrative only and is for the purpose of teaching those skilled in the art the general manner of carrying out the invention. It is to be understood that the forms of the invention shown and described herein are to be taken as embodiments. Elements and materials may be substituted for those illustrated and described herein, parts and processes may be reversed, and certain features of the invention may be utilized independently, all as would be apparent to one skilled in the art rely after having the benefit of this description of the invention. Changes may be made in the elements described herein without departing from the spirit and scope of the invention as described above and below.

What is claimed is:

1. A method for facilitating system access on a server to a threatened user account located on a network through a supplemental username, the method comprising the steps of:
   detecting, by a threat counter associated with the system, a threat to a user account, the threat comprising at least five failed attempts to access the user account within five minutes, a failed attempt comprising receiving an incorrect username and password combination;
   restricting system access to the user account by through the system disabling a primary username associated with the user account;
   generating, by the server, a notification that the user account has been restricted;
   generating, by the server, a supplemental username associated with the account; and
   securely delivering the supplemental username.

2. A method for facilitating system access on a server to a threatened account located on a network, comprising:
   detecting, by a threat counter associated with the system, a threat to an account associated with a primary username and a password;
   disabling, by the server, the primary username associated with the user account in response to the threat;
   generating, by the server, a supplemental username associated with the user account; and
   securely communicating the supplemental username.

3. The method of claim 2, wherein the threat comprises a predetermined threshold of attempts to access the account via submission of an incorrect username and password combination.

4. The method of claim 3, wherein the predetermined threshold of attempts to access the account occurs within a predetermined amount of time.

5. The method of claim 3, wherein the predetermined threshold is based at least in part on a user characteristic.

6. The method of claim 2, wherein the threat comprises five attempts to access the account via submission of an incorrect username and password combination within five minutes.

7. The method of claim 2, further comprising confirming the threat as an attack on the account.

8. The method of claim 2, wherein the supplemental username is generated in response to the threat.

9. The method of claim 2, wherein the supplemental username is randomly generated.

10. The method of claim 2, wherein the supplemental username is generated based at least in part on user input.

11. The method of claim 2, wherein secure communication of the supplemental username comprises at least one of physical delivery, text message, or phone call.

12. The method of claim 2, further comprising:
   activating the primary username associated with the account; and
   disabling the supplemental username associated with the account.

13. The method of claim 12, wherein activating the primary username occurs after a predetermined period of time.

14. A method for facilitating system access on a server to a threatened account located on a network, comprising:
   creating, by the server, a supplemental username associated with the threatened account based at least in part on user input;
   detecting, by a threat counter associated with the system, a threat to an account associated with a primary username and a password;
   disabling, by the server, the primary username associated with the user account in response to the threat;
   enabling, by the server, the created supplemental username associated with the user account; and
   generating, by the server, a notification that the account has been restricted.

* * * * *